(12) United States Patent
Warsi et al.

(10) Patent No.: US 7,396,063 B2
(45) Date of Patent: Jul. 8, 2008

(54) INTEGRATED CLOSEOUT FLAP FOR RECLINING REAR SEAT ASSEMBLIES

(75) Inventors: Aamir Warsi, Howell, MI (US); Robert Joseph Hazlewood, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 353 days.

(21) Appl. No.: 11/260,453

(22) Filed: Oct. 27, 2005

(65) Prior Publication Data

US 2007/0096511 A1    May 3, 2007

(51) Int. Cl.
*B60R 5/04* (2006.01)
(52) U.S. Cl. .................... 296/24.44; 296/191; 296/66
(58) Field of Classification Search ............. 296/191, 296/37.16, 63, 66, 67, 24.43, 24.44
See application file for complete search history.

(56) References Cited

U.S. PATENT DOCUMENTS

| | | | | |
|---|---|---|---|---|
| 3,011,822 A | * | 12/1961 | May et al. ................. 296/66 |
| 4,198,091 A | * | 4/1980 | Appleton .................. 296/63 |
| 4,351,555 A | * | 9/1982 | Hashimoto ............... 296/37.16 |
| 4,848,826 A | * | 7/1989 | Kuwabara et al. ......... 296/97.23 |
| 5,658,046 A | * | 8/1997 | Rus ........................ 297/378.1 |
| 5,716,091 A | * | 2/1998 | Wieczorek ............... 296/37.16 |
| 5,813,715 A | * | 9/1998 | Musukula et al. ......... 296/63 |
| 6,283,533 B1 | * | 9/2001 | Gavin ..................... 296/136.05 |
| 6,565,138 B2 | * | 5/2003 | Sparrer .................... 296/65.01 |
| 7,216,916 B2 | * | 5/2007 | Czerwinski et al. ........ 296/66 |

FOREIGN PATENT DOCUMENTS

| | | | |
|---|---|---|---|
| JP | 1-14523 | | 4/1989 |
| JP | 2001080421 A | * | 3/2001 |
| JP | 2002104073 A | * | 4/2002 |

* cited by examiner

*Primary Examiner*—Jason S Morrow
(74) *Attorney, Agent, or Firm*—Gifford, Krass, Sprinkle, Anderson & Citkowski, P.C.

(57) ABSTRACT

A rear seat assembly is for use in an automotive vehicle having a package shelf includes a generally horizontal seat cushion, a seat back and a flap. The seat cushion is fixedly secured to the vehicle. The seat back is pivotally coupled to the vehicle for movement between a plurality of seating positions relative to the seat cushion. The seat back has a rear surface spaced apart from the package shelf to define a gap therebetween. The flap is fixedly secured to the rear surface of the seat back. The flap has a front wall adapted to be fixedly secured to the rear surface of the seat back. The front wall has an upper edge. An upper wall extends outwardly from the upper edge of the front wall for substantially concealing the gap while the seat back is in any one of the seating positions.

14 Claims, 2 Drawing Sheets

INTEGRATED CLOSEOUT FLAP FOR RECLINING REAR SEAT ASSEMBLIES

BACKGROUND OF THE INVENTION

1. Field of the Invention

The invention relates to seat assemblies for automotive vehicles. More particularly, the invention relates to a flap for filling a space between a seat assembly and a rear shelf of a vehicle.

2. Description of the Related Art

An automotive vehicle includes a passenger compartment and rows of seat assemblies for supporting passengers within the passenger compartment. Each seat assembly includes a seat cushion and a seat back. It is becoming increasingly common for the seat back in rear seat assemblies to be pivotable relative to the seat cushion between a plurality of seating positions relative to the seat cushion. Typically, the rear seat back abuts a rearwardly positioned package tray or shelf. Sometimes a particular vehicle design, due to packaging constraints and other design criteria, does not allow for a rear seat back to immediately abut the package shelf. This can result in an unsightly gap between the rear seat back and the package shelf that is visible externally.

Japanese Utility Model Open Publication No. 1-14523 attempts to address this problem by providing a flap that is pivotally coupled to a forward edge of the package shelf for movement between a use position filling the gap between the rear seat back and the package shelf and a retracted position folded rearwardly overlying the package shelf. The problem with this design is that a user must always manually operate the flap between the use and retracted positions. Additionally, the use of a pivoting flap introduces unnecessary complexity and cost to the build of the vehicle in an assembly plant.

Therefore, it remains desirable to provide a means of concealing the gap between the rear seat back assembly and the package shelf that does not require manual operation by the user; that is relatively simple and economical over conventional solutions; and accommodates the pivotal movement of the rear seat back.

SUMMARY OF THE INVENTION

According to one aspect of the invention, a rear seat assembly is provided for use in an automotive vehicle having a package shelf. The rear seat assembly includes a seat back and a flap. The seat back is pivotally coupled to the seat assembly for movement between a plurality of seating positions. The seat back has a rear surface spaced apart from the package shelf to define a gap therebetween. The flap is fixedly secured to the rear surface of the seat back. The flap has a front wall adapted to be fixedly secured to the rear surface of the seat back. The front wall has an upper edge. An upper wall extends outwardly from the upper edge of the front wall for substantially concealing the gap while the seat back is in any one of the seating positions.

According to another aspect of the invention, a flap is provided for concealing a gap defined between a rear surface of a seat back and a package shelf of a vehicle. The flap includes a front wall and an upper wall. The front wall is adapted to be fixedly secured to the rear surface of the seat back. The front wall has an upper edge. The upper wall extends outwardly from the upper edge of the front wall for substantially concealing the gap between the rear surface of the seat back and the package shelf. The upper wall includes a proximal segment, a distal segment and an intermediate segment that extends therebetween. The segments are non-parallel with respect to each other.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
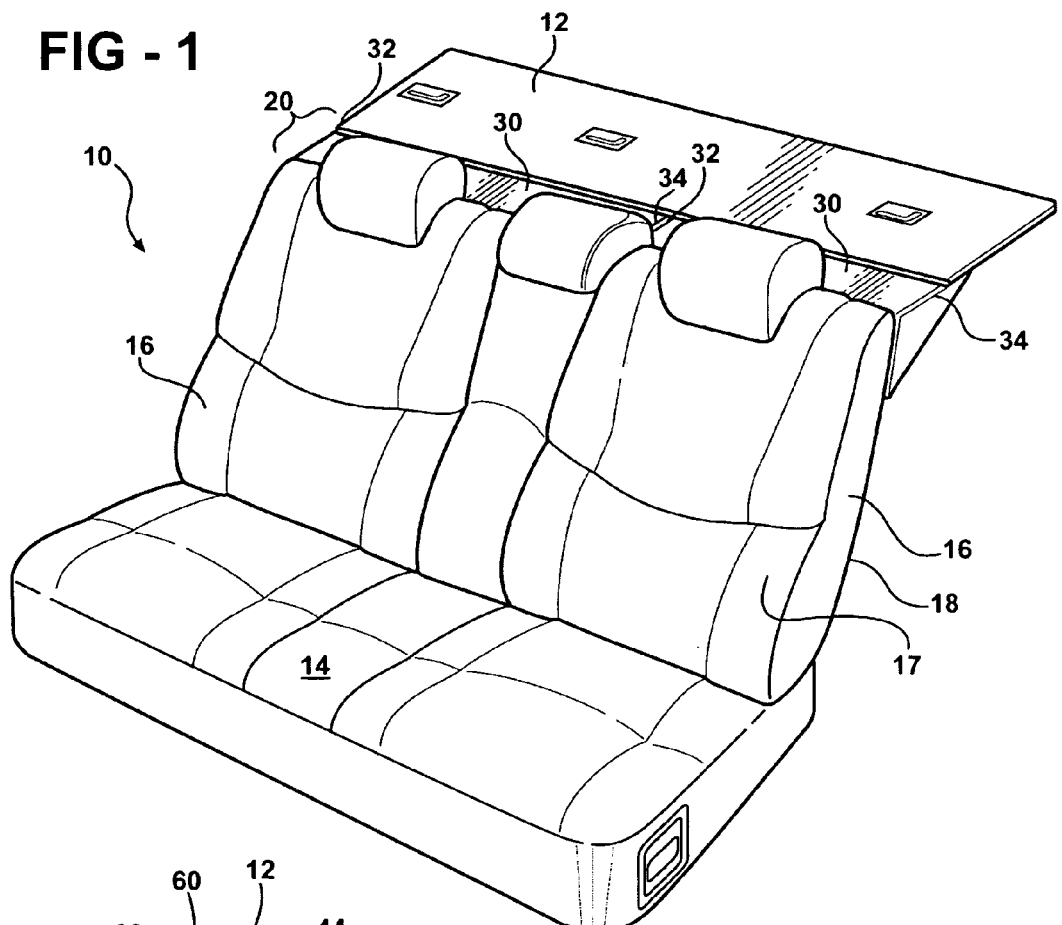
FIG. 1 is a front perspective view of a seat assembly according to the invention.

Referring to the figures, a rear seat assembly for an automotive vehicle is generally indicated at 10. The vehicle includes a rear package shelf 12. The rear seat 10 includes a generally horizontal seat cushion 14 and a seat back 16. The seat cushion 14 and back 16 are conventionally constructed with a rigid inner frame, a foam pad and an outer trim cover concealing both the frame and foam pad. The seat back 16 is pivotally coupled either to the vehicle body or the seat cushion 14 by a free pivot arrangement or a recliner mechanism, as known by one having ordinary skill in the art. The seat back 16 is angularly adjustable between a plurality of seating positions about a fixed and generally horizontal pivot axis relative to the seat cushion 14. The seat back 16 is shown in a forward position in FIG. 1. The seat back 16 is shown in a rearward position in FIG. 2. The seat back 16 includes opposite front 17 and rear 18 surfaces. The rear surface 18 of the seat back 16 is spaced apart in a fore and aft sense in the vehicle relative to the package shelf 12, thereby defining an externally visible gap 20 therebetween. The gap 20 varies in size as the seat back 16 is adjusted between the forward and rearward positions. Described in greater detail below, a flap 30 is provided for concealing the gap 20 between the seat back 16 and the package shelf 12 as the seat back 16 is moved between the forward and rearward positions.

The flap 30 extends between opposite ends 32, 34 along the width of the seat back 16. More specifically, the flap 30 includes front wall 36 that extends between opposite upper 38 and lower 40 edges. The flap 30 also includes an upper wall 42 that extends between the upper edge 38 of the front wall 36 and a distal end 48. Preferably, a plurality of stiffening ribs extends between the flap 30 and the front wall 36. The front wall 36 is adapted to be fixedly secured to the rear surface 18 of the seat back 16. Specifically, a hole 49 is formed in the front wall 36 that allows a fastener, such as a rivet, screw and the like, to pass therethrough and into a corresponding bole (not shown) in the rear surface 18 of the seat back 16. Optionally, a barb-type fastener is integrally formed with or otherwise fixedly secured to the front wall 36. Optionally, an opening 50 is formed in the front wall 36 or the upper wall 42 that allows a restraint belt (e.g. shoulder belt, or belt from a child seat) to be fed therethrough. The flap 30, after assembly to the rear surface 18, moves with seat back 16 to fill the gap 20 between the rear surface 18 and the package shelf 12.

The upper wall 42 includes a proximal end 44, an intermediate portion 46 and the distal end 48. The proximal end 44 extends from the upper edge 38 of the front wall 36 at an angle ranging between 80 and 85 degrees. The intermediate portion 46 extends from the proximal end 44 at an angle ranging between 20 and 30 degrees. The distal end 48 extends from the intermediate portion 46 at an angle ranging between 30 and 40 degrees. The relative angles between the proximal end 44, intermediate portion 46 and distal end 48 allow the flap 30 to move with the seat back 16 without interfering with the package shelf 12 and, at the same time, remain in close proximity to the package shelf 12 to conceal or fill the gap 20. Optionally, flexible tabs 60 extend from the package shelf 12 to further minimize or fill any remaining space between the flap 30 and the package shelf 12.

Preferably, the flap 30 is made from an injection molded plastic such that the front wall 36 and the upper wall 42 are integrally formed as a unit, Any suitable plastic material known by those having ordinary skill in the art may be used, such as polypropylene, ABS and nylon. It is appreciated from the drawings that the flap 30 can be made from a single piece, and in some instances can be made from a single piece of molded plastic.

Figure 2:
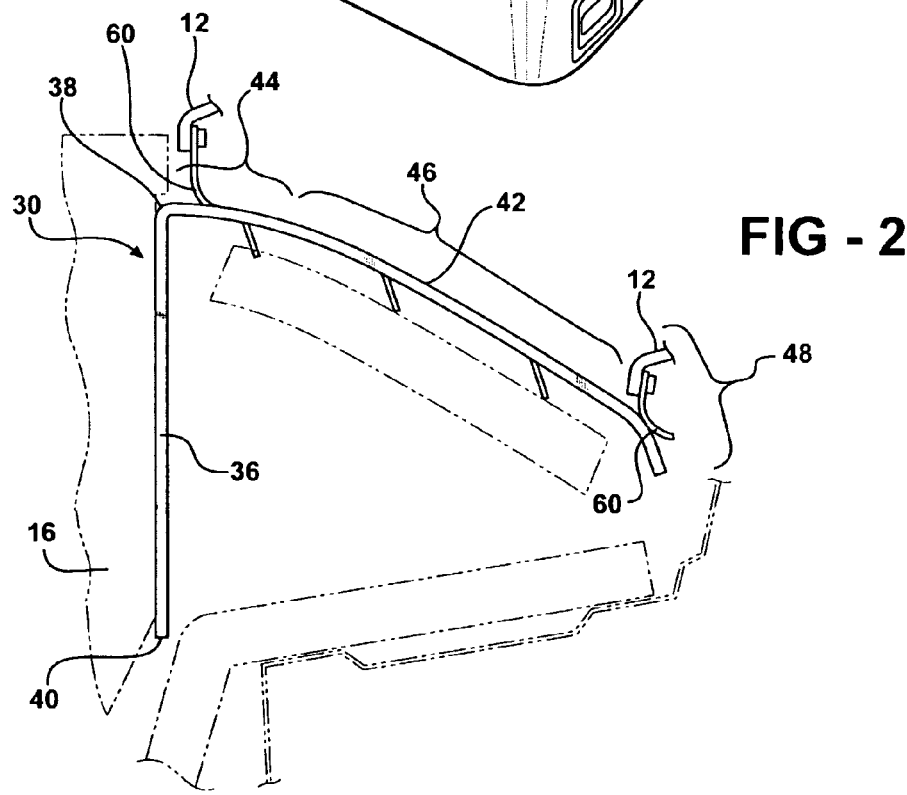
FIG. 2 is a cross sectional view of the seat assembly according to the invention.
Figure 3:
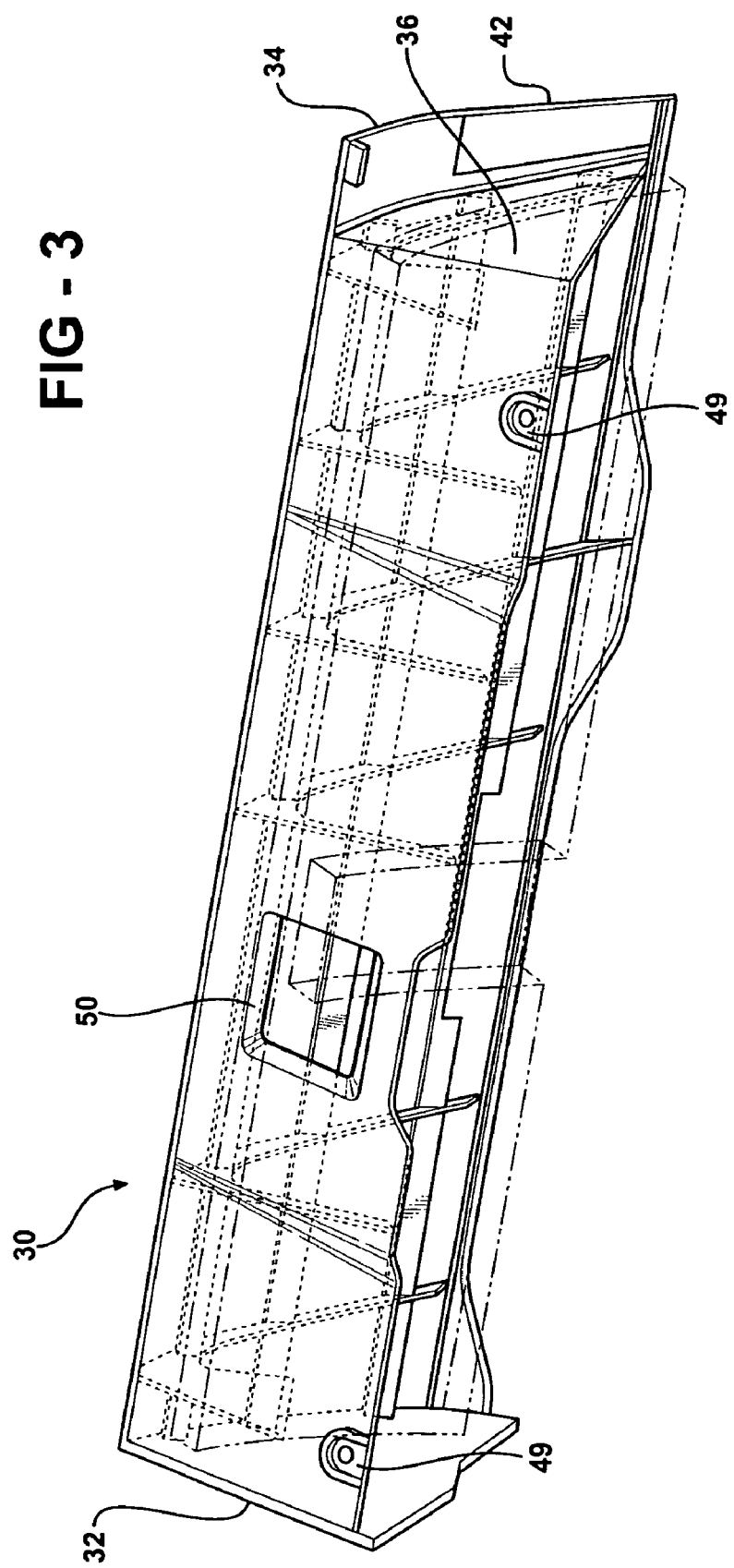
FIG. 3 is a front perspective view of a flap of the seat assembly according to the invention.

As best shown in FIG. 1, the rear seat assembly 10 is shown in a "40/60" configuration, wherein the seat back 16 is split into two sides. One side has a width that extends across 40% of the passenger compartment width. The other side has a width that extends across 60% of the passenger compartment width. Each of the 40% and 60% sides is independently movable between the seating and stowed positions. Each 40% and 60% side, therefore, requires separate flaps 30 having lengths corresponding with the widths of the respective 40% and 60% sides of the seat back 16. It should be readily appreciated that the length of the flap 30 can be designed to accommodate a variety of seat back 16 configurations, such as a 50/50 split, a 40/20/40 split, or no split (i.e. a single seat back extending across the entire width of the passenger compartment).

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A rear seat assembly for use in an automotive vehicle having a package shelf, said rear seat assembly comprising:
   a seat back pivotally coupled to the rear seat assembly for movement between a plurality of seating positions, said seat back having a rear surface spaced apart from the package shelf to define a gap therebetween; and
   a flap made from a single piece of molded plastic fixedly secured to said rear surface of said seat back, said flap having:
      a front wall adapted to be fixedly secured to said rear surface of said seat back, said front wall having an upper edge;
      an upper wall extending outwardly from said upper edge of said front wall and slidable under the package shelf when the seat back is moved between the plurality of seating positions for substantially concealing said gap by being located underneath the package shelf while said seat back is in any one of the plurality of seating positions.

2. The seat assembly as set forth in claim 1, wherein said flap extends along a width of said rear surface of said seat back.

3. The seat assembly as set fort in claim 1, wherein said upper wall includes a proximal end, a distal end and an intermediate segment that extends therebetween, said segments being nonparallel with respect to each other.

4. The seat assembly as set forth in claim 1, wherein said upper wall has a proximal end extending from said front wall at an angle ranging between 80 and 85 degrees.

5. The seat assembly as set forth in claim 4, wherein said upper wall has an intermediate portion extending from said proximal end at an angle ranging between 20 and 30 degrees.

6. The seat assembly as set forth in claim 5, wherein said upper wall has a distal end extending from said intermediate portion at an angle ranging between 30 and 40 degrees.

7. A flap for concealing a gap defined between a rear surface of a seat back and a package shelf of a vehicle, said flap comprising:
   a front wall made from a single piece of molded plastic adapted to be fixedly secured to the rear surface of the seat back, said front wall having an upper edge;
   an upper wall extending outwardly from said upper edge of said front wall and slidable under the package shelf when the seat back is moved between the plurality of seating positions for substantially concealing the gap between the rear surface of the seat back and the package shelf by being located underneath the package shelf, said upper wall including a proximal end, a distal end and an intermediate portion that extends therebetween, said ends and said intermediate portion being nonparallel with respect to each other.

8. The flap as set forth in claim 7, wherein said proximal end of said upper wall extends from said front wall at an angle ranging between 80 and 85 degrees.

9. The flap as set forth in claim 8, wherein said intermediate portion of said upper wall extends from said proximal end at an angle ranging between 20 and 30 degrees.

10. The flap as set forth in claim 9, wherein said distal end of said upper wall extends from said intermediate portion at an angle ranging between 30 and 40 degrees.

11. The flap as set forth in claim 7, wherein said flap extends along a width of said rear surface of said seat back.

12. The flap as set forth in claim 7, wherein said front wall includes at least one hole allowing a fastener to extend therethrough for fixedly securing said flap to the rear surface of said seat back.

13. The seat assembly as set forth in claim 1, further comprising a flexible tab attached to the package shelf and extending to said upper wall of said flap for further concealing said gap while said seat back is in any one of the plurality of seating positions.

14. The flap as set forth in claim 7, further comprising a flexible tab extending from said upper wall to the package shelf, said flexible tab attached to said package shelf.

* * * * *

UNITED STATES PATENT AND TRADEMARK OFFICE
CERTIFICATE OF CORRECTION

PATENT NO. : 7,396,063 B2 Page 1 of 1
APPLICATION NO. : 11/260453
DATED : July 8, 2008
INVENTOR(S) : Aamir Warsi et al.

It is certified that error appears in the above-identified patent and that said Letters Patent is hereby corrected as shown below:

Column 2, line 53 replace "bole" with --hole--
Column 3, line 12 replace "unit," with --unit.--
Column 4, claim 3, line 1 replace "fort" with --forth--

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,396,063 B2  Page 1 of 1
APPLICATION NO. : 11/260453
DATED : July 8, 2008
INVENTOR(S) : Aamir Warsi et al.

It is certified that error appears in the above-identified patent and that said Letters Patent is hereby corrected as shown below:

Column 2, line 53 replace "bole" with --hole--
Column 3, line 12 replace "unit," with --unit.--
Column 4, claim 3, line 4 replace "fort" with --forth--

This certificate supersedes the Certificate of Correction issued September 23, 2008.

Signed and Sealed this

Fourteenth Day of October, 2008

JON W. DUDAS
*Director of the United States Patent and Trademark Office*